May 22, 1962 E. C. EVANS III, ET AL 3,035,445
AEROSOL SAMPLER
Filed April 11, 1958 2 Sheets-Sheet 1

INVENTORS
EVAN C. EVANS III
FREDERIC A. FRENCH
BY
ATTORNEYS

May 22, 1962  E. C. EVANS III, ET AL  3,035,445
AEROSOL SAMPLER
Filed April 11, 1958  2 Sheets-Sheet 2

INVENTORS
EVAN C. EVANS III
FREDERIC A. FRENCH
BY
ATTORNEYS

United States Patent Office 3,035,445
Patented May 22, 1962

3,035,445
AEROSOL SAMPLER
Evan C. Evans III and Frederic A. French, Berkeley, Calif., assignors to the United States of America as represented by the Secretary of the Navy
Filed Apr. 11, 1958, Ser. No. 728,022
11 Claims. (Cl. 73—421.5)
(Granted under Title 35, U.S. Code (1952), sec. 266)

The invention described herein may be manufactured and used by or for the Government of the United States of America for governmental purposes without the payment of any royalties thereon or therefor.

This invention relates to a sampler and particularly to one employing a device for electrostatically precipitating droplets or particles from an aerosol for recordation and later analysis.

In the past a large variation of sizes of droplets found in clouds have been reported as well as a large variation of particles found in other aerosols. Such variations are due, in part, to the large number of factors which influence the size of individual droplets or particles while in the cloud or aerosol during and after collection. Some variation, however, is due to the natural differences between aerosols. In addition, some is due to the methods and devices used to collect the droplets or particles. In this respect low impaction efficiencies for the smaller drops or particles result since devices presently used do not precipitate the smaller ones as well as the larger ones. Although it is desirable to increase the impaction efficiencies by precipitating the droplets, the breaking of larger sized droplets into smaller ones must be avoided. Further, there are inherent resolution difficulties involved in determining the nature of the droplets or particles as well as the rate of formation. Therefore, it is obvious there is a need for a sampler which not only reduces the low impaction efficiencies but also solves to some extent the difficulties of resolution.

Therefore a primary object of the invention is to provide a sampler having a precipitating means for permitting relatively high impaction efficiencies for smaller droplets or particles.

Another object is the provision of a device which provides a continuous and permanent record of the size of liquid droplets of an aerosol in contrast to the time it requires to form such droplets.

Still another object is to provide a device for increasing the impaction efficiencies of a precipitator which prevents the break-up of larger droplets, or particles.

According to this invention an aerosol has droplets or particles thereof precipitated onto a means for indicating them, thereby providing a continuous record of aerosol character as a function of time, the record being suitable for physical and chemical analysis at a later date. Such is accomplished by providing an electrostatic means for precipitating particulate matter from the aerosol onto a moving film provided by a mechanism for permanently recording them. The configuration of the precipitating head, the details and novelty of which will subsequently be discussed, amounts to a plurality of separated pins which are positioned parallel to each other and equally spaced around a circular intake port through which the aerosol being analyzed travels. The sample stream is symmetrically surrounded by an annular stream of a suitable gas at the same velocity as the sampling stream. The additional stream functions to reduce or eliminate disruptive turbulence and diversion of the sampling stream from the recording surface. A direct current high voltage potential is applied to the pins which provides potential and current at a high enough level to cause continuous corona discharge of the device so a discharge is effected that accelerates the aerosol and strips droplets therefrom, which increases the impaction efficiencies. The incorporated structure operates so as the aerosol sample stream enters the concentric symmetrical region of intense multipoint electric corona discharge the preponderance of particulate matter is precipitated onto a moving recording surface, or film that is caused to pass before the charged pins and intake port. Such impinging matter forms permanent spots on a specially chosen film so the physical and chemical analysis may be made at a later time. The speed of the recording film as well as the volume of aerosol may be controlled and such rate and amount may be utilized to determine the rate of droplet formation.

The nature of this invention as well as other objects and advantages thereof will be more readily apparent from consideration of the following specification relating to the annexed drawings.

Figure 1:
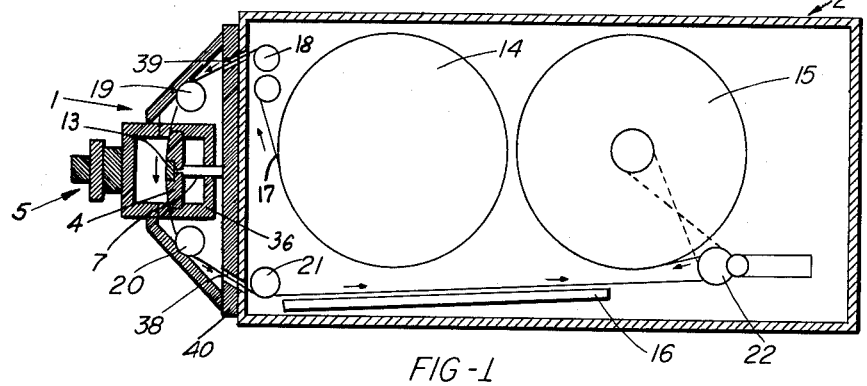
FIGURE 1 shows a diagrammatic top plan view of some of the various elements contained in the sampler.
Figure 2:
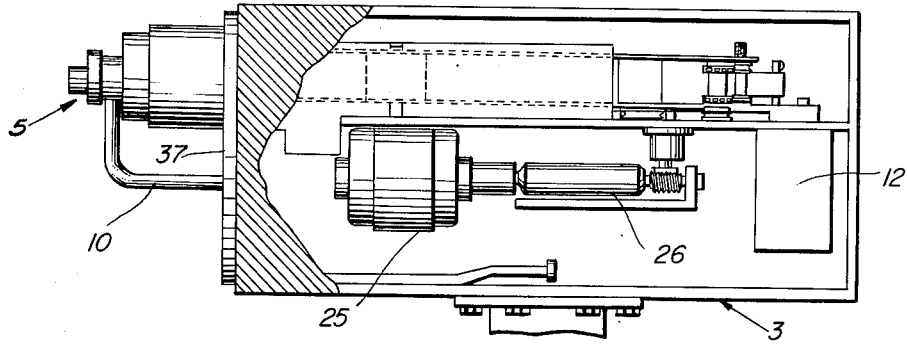
FIGURE 2 shows a diagrammatic view of one side of the sampler with a portion of the wall broken away.

FIGURES 1 and 2 show the basic components which constitute an embodiment of the invention. Three compartments are involved which include a precipitation chamber 1, a recording means 2 (both shown in FIGURE 1) and a compartment 3 (FIGURE 2) for housing and supporting ancillary equipment.

Precipitation chamber 1 is spanned by a bridge 4. At one end is a precipitation head 5, more clearly shown in FIGURE 5, having a cylindrical intake port 6 positioned therein. At the other end are two ports 7 (only one being shown in FIGURE 1) for permitting the passage of air and electrical leads. An annulus 8 is positioned coaxially with the intake port 6 and contains a plurality of needle-like pins 9, equally spaced around the intake port. Voltage is applied to the pins through a dry air duct 10, shown in FIGURES 1 and 5, coming from a tripler unit 11 (FIGURE 6) that is connected to transformer 12 (FIGURE 6) which is connected to a source of electric power. Beyond the inner end of pins 9, a metal disc or button 13 is attached to bridge 4. The button is connected to a large resistor 33 which is grounded.

The recording compartment, as shown in FIGURE 2, comprises a supply or feed reel 14, take-up reel 15, and drying duct 16. A film 17, is fed from the feed reel over a drag sprocket 18, over roller 19, bridge 4, and around roller 20 (all of the latter three being located in tthe precipitation chamber) and around roller 21, past drying duct 16, over a drive sprocket 22, and finally to the take-up reel 15.

Figure 3:
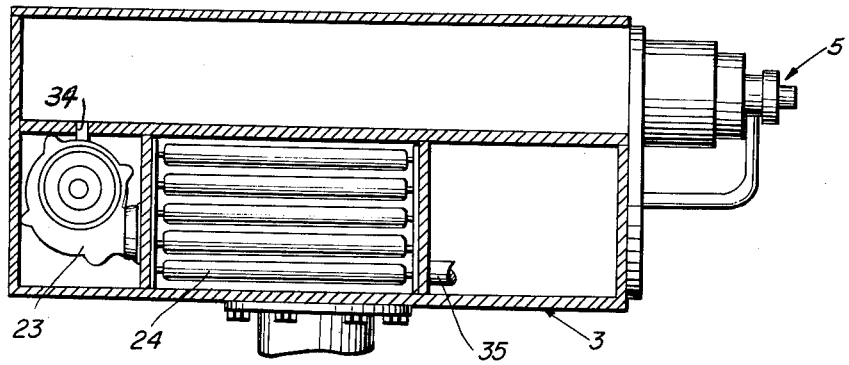
FIGURE 3 shows a diagrammatic view of the opposite side of the sampler with one side wall absent.

The third compartment shown in FIGURES 2 and 3 comprises a small blower 23, that draws air from the recording compartment. The blower is attached to absorbing beds 24, which in turn are attached to drying duct 16. A small electric motor 25 (FIGURE 2) is employed to drive a variable speed unit 26 that is linked to a film drive sprocket by suitable reduction gearing. This compartmental so comprises the tripler unit 11, and transformer 12, both heretofore mentioned.

Precipitation head 5, shown more clearly in FIGURE 5, consists of an intake tube 6 of suitable size such as ½ inch diameter, 2¼ inches long, and is made of suitable material, such as Lucite, for the reasons governing the choice for the precipitation chamber to be discussed subsequently. The outer end 42 of the tube is sharpened to ease the flow of air into it and to tend to limit the aerosol intake to the cross-sectional area of the tube itself. Positioned around tube 6, are some 8 separate needle-like pins 9, having beveled ends of preferably 60 degrees, of suitable length such as 1⅛ inch, and which extend some 3/32 inch beyond the inner end of the intake tube. The precipitation head with the configuration of pins shown will bring about a smooth electrical discharge over a wide range of potential, as 8,000 to 30,000 volts. As indicated, the pins are separate one from the other and hence, adjustment of the discharge pattern is eased. An important matter is that the pins be equally spaced and parallel to one another so that the desired discharge pattern is maintained. The material of the pins is chosen so they will act as conductors and retain a relatively long life, and hence, are made of a suitable metal alloy preferably predominantly of the platinum or paladium group. The forward baffle or metal mesh 50, subsequently to be discussed, is positioned far enough behind the ends of the pins to prevent disturbance of the discharge pattern, which is in contrast to a configuration that has a solid core or body with projections extending but a short distance therefrom. The latter configuration provides a solid edge from which the current flows and arcing from it to the receiver button results. If a small number of pins are used there is a sparse discharge pattern which fails to surround the aerosol flowing within the contour of the discharge pattern. However, a large number of pins resembles a solid edge and is also undesirable. Hence some number, preferably 8, are utilized.

The external ends of the pins are rounded to an optimum radius of curvature of less than 0.01 inch and greater than 0.001 inch and in a preferred embodiment is approximately 0.001 inch. The smaller the radius of curvature the less would be the voltage required to start the discharge, but with too small a radius of curvature the current would tend to injure the point due to the effects of heat and then surface irregularities would develop on the point. Too large a radius of curvature would require a current of such magnitude that it would be injurious to the discharge pattern desired. The above-specified range of curvature yields an avoidance of these difficulties. To avoid physical surface irregularities and thereby effect a smooth discharge, the pins may be contoured by a suitable electropolishing technique, or other conventional means such as grinding, polishing or tumbling.

The tube, pins, and remaining head structure are supported by a block 43, which may be integral with chamber 1 or otherwise supported therein. Intake tube 6 has an encircling outer collar 44, which has an annular lip 45 that substantially surrounds a hollow space 46. Dry air duct 10, with conducting lead 30 therein, has one end suitably supported in block 43 with a portion passing through lip 45, thereby limiting the lip from completely surrounding intake tube 6. As mentioned, lead 30 has metal clip 31 attached thereto which contacts an annular metal collar 32 that surrounds the intake tube and is snugly fitted within lip 45. A plurality of openings 32a are provided in the annular collar, some of which support the pins 9 leaving the ones remaining to provide passage for the dry incoming air from duct 10 to pass along the pins. Those holes specified 32a in FIGURE 4 are the pinless ones providing air passage. An annular spacer 47, of suitable size and non-conducting material such as plastic, is positioned against the collar and is of less thickness than the collar. Beyond the spacer a wire metal baffle 48, of suitable type such as 100 mesh, is positioned, which reduces the streaming of the air and assists in distributing high voltage to the pins. Positioned beyond this baffle is another plastic spacer 49, another baffle 50, and spacer 51, the number of spacers and baffles depending on the pin lengths and baffles considered to be applicable. Block 43 has an annular shoulder 52 on the inner end which supports the spacers and baffles. The outer end of collar 44 provides a shoulder 53 which is contacted and held by a plastic nut 55 of the type shown which has threads 54 on an inner face thereof engaging threads 56 on the outer surface of block 43. Because of the annular space between tube 6 and spacers 47, 49, 51, the dry air coming through duct 10 passes into space 46 through the openings in collar 32 and along the pins through the baffles into the area beyond the plane in front of the ends of the pins.

The precipitation chamber is preferably made of a sturdy corrosion resistant, moisture proof material, such as Lucite, which is a non-conductor of electricity and transparent to thus ease inspection and is of suitable size and shape similar to that shown in FIGURES 1 and 2. In one portion of the chamber is precipitation head 5, and beyond it bridge 4 for supporting button 13 and film 17 that moves thereover. The bridge is made of a strong material, preferably Teflon, which permits the film to easily slide thereover, and thus must be of such character as to be non-adherent to the film. The bridge is firmly supported in the chamber in some convenient manner. The bridge-supported button 13 is made of an electrical conducting material such as brass, and of suitable size and shape such as ½ inch diameter, ¼ inch thick, but preferably circular. To avoid uneven movement of the film, the button is coated with chromium, rhodium, or other suitable material to reduce the sliding friction between it and the film, and is located substantially 1 inch beyond the plane of the end of pins 9. Beyond bridge 4 in chamber wall 36 an opening 7 is provided to permit a passage for aerosol being exhausted and electrical leads. Attached to button 13 is a resistor of suitable size such as 100 million ohms for reducing the current in the discharge pattern, which may be grounded in a convenient manner. The aerosol being sampled may pass through the intake tube, as shown by arrows 57 in FIGURE 5, and out an opening in block portion 57, located below the main body of the chamber. Suitable openings 38, 39, are provided in a wall 40 of the chamber to permit the film to pass therethrough. As stated, two rotatable rollers 19, 20 are suitably supported in the chamber to train the film thereover. Still another port (not shown) is provided in the block to permit dry air to pass into tube 10 which permits passage from the block to the precipitation head 5.

Figures 4, 5:
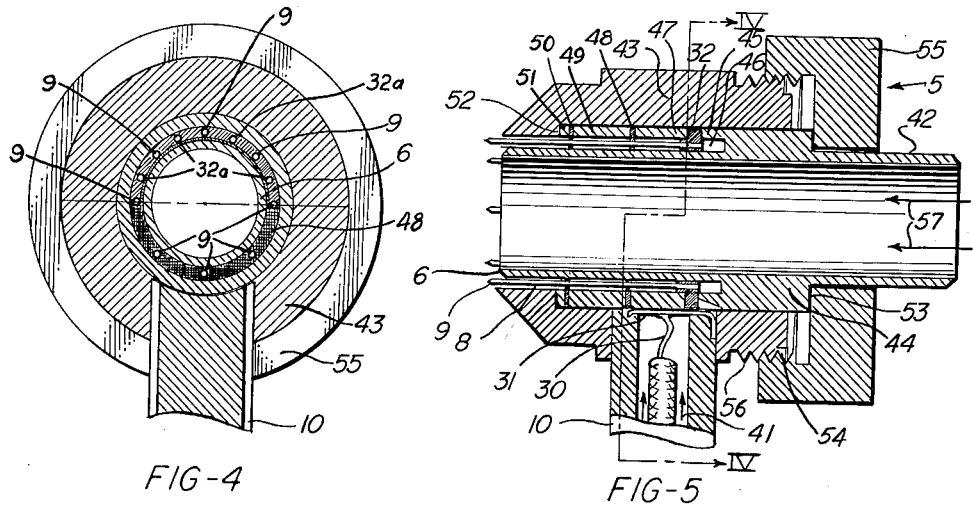
FIGURE 4 shows a cross sectional view of the precipitation head at a region indicated by lines IV—IV of FIGURE 5.
FIGURE 5 shows a sectional view of the precipitation head.

The dry air duct 10 is made of a suitable material such as plastic and as shown in FIGURES 2 and 5, the dry air (see arrows 41) passes therethrough, as well as a properly insulated electrical lead 30 which is connected to tripler unit 11, and clip 31.

As an additional or alternate feature, external of the precipitation head and receiving button, a direct current carrying coil may be provided for effecting a focusing magnetic field for controlling the corona discharge and travel of the particles. Such will be accomplished upon the creation of the magnetic field which will tend to restrict the path of motion of the particles to the zone between the discharge points or pins and collecting surface.

Figure 6:
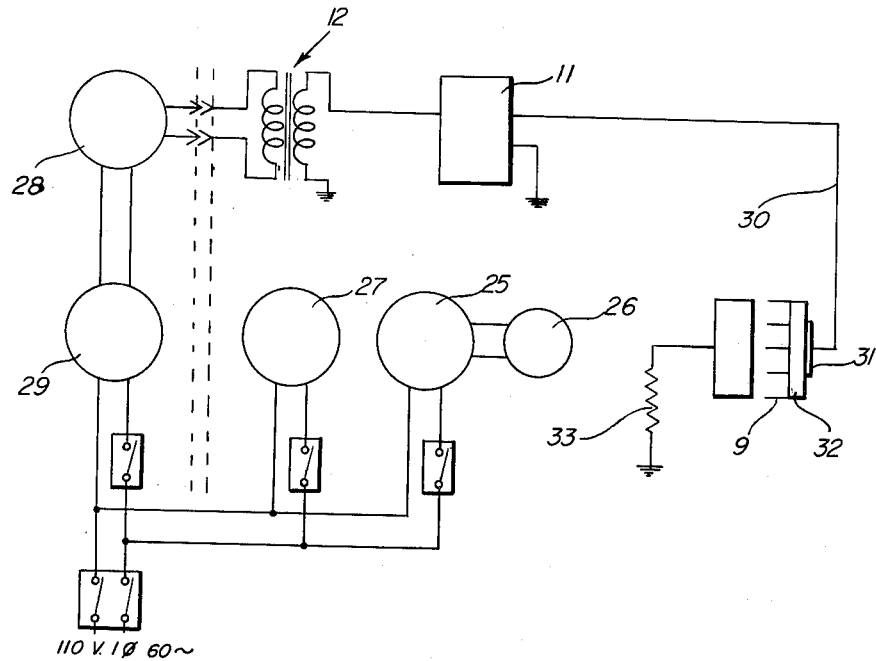
FIGURE 6 shows a basic diagram of a power circuit that may be used with this invention.

The electrical system of FIGURE 6 comprises any suitable means for providing electric power to drive the variously required motors and high rippling voltage potential used to supply sufficient potential to the precipitating pins 9. The electric blower motor 27, and drive motor 25, may be driven by a suitable available source, and as shown, may be connected to the same source as the rippling voltage potential equipment.

The potential needed to effect the function sought of the precipitating pins requires additional equipment. As a practical matter a voltage above 15 kv. is of little value and the particular form of power most adaptable is a rippling direct current. FIGURE 6 indicates one combination of electrical components that may be used that consist of an inverter 29 connected to a suitable source of electric power of 110 volts, 60 cycle A.C., since it is the form most easily obtainable. The inverter changes the 60 cycles to 400 cycles which in turn is fed into variac 28, which amounts to a transformer whose output voltage can be varied over a wide range. From the variac the power is fed into transformer 12 which increases the voltage and then directs the power to a tripler unit which approximately triples it and in this instance provides a rippling direct current potential. This potential is directed to pins 9 by high voltage lead 30 that extends to clip 31 which engages collar 32 having pins 9 imbedded therein. The current discharge, termed a corona discharge, is from the pins to button 13. To reduce the amount of current passing between the pins and button, a resistor 33 of some suitable size, such as 100 million ohms, is attached to the receiver and grounded. One problem encountered with a device of this type is that the effective resistance of the aerosol between the cathode pins 9 and the anode combination of film 17 and button 13 will shift with changing quantities of particles and character thereof in this precipitation zone. In addition to affecting the coronal discharge pattern a substantial drop in resistance due to such a shift in the aerosol particles may even produce sparking and arcing. Resistor 33 serves a negative feedback function to quell such a change. In addition, for this reason the voltage supply is one characterized by "poor regulation."

To prevent the wet droplets from smudging on the film being wound, a suitable drying system is provided. The one shown consists of a blower 23, which is driven by an electric motor 27 of suitable size such as 1/100 H.P. The blower is attached to a pipe 34 which leads to the upper compartment, so upon operation of the blower, air is drawn from the upper compartment through the pipe and into some suitable moisture absorbing beds 24 indicated in FIGURE 3. As shown, beds of silica gel may be used for this purpose. The dried air passes from the drying beds into a pipe 35, partly shown in FIGURE 3, through drying duct 16 located in the upper compartment and which has a series of ports (not shown). When the wet droplet covered film passes the duct, dry air passing through the ports dries the film thus preventing the droplets from smudging when the film is moved onto take-up reel 15.

The upper or recording compartment 2 as well as the lower compartment 3, are housed in a common casing made of suitable material, such as aluminum. Supply reel 14 and take-up reel 15 are of suitable size, such as 10 inches. Suitable 1/32nd inch slots corresponding to openings 38, 39, are provided to permit the film to pass into the precipitation chamber and over the bridge. As mentioned, suitable rollers 18, 20 made of some material, such as Teflon, are supported in the upper compartment to guide and train the film over, and for the sake of simplicity, most guiding and positioning rollers have been omitted from this disclosure. Suitable means may be employed to control and indicate the reel speed.

The type of film employed depends upon the aerosol being analyzed and particularly what is to be precipitated therefrom. The film so utilized and impinged by the precipitated particles, should be moderately conducting, otherwise the discharge will not flow to the receiver button, or at least would to some degree travel around the film and thereby create an uneven and undesirable discharge pattern. As indicated, the film employed is later developed for purposes of analysis. In addition, another film carrying a suitable re-agent for the primary film may also be wound on the take-up reel to aid in developing or preparing the primary film for later use.

In use, the device is located in a particular area where an aerosol to be sampled is available and a dry air source of suitable value, such as 10 p.s.i. gauge, along with suitable means for controlling its flow, is connected to an opening in block 37 which leads to the dry air duct 10. Another opening is connected to a vacuum source of suitable value, such as 20 inches, and some suitable mechanism may be utilized for its control. The vacuum draws the surrounding aerosol through intake tube 6 and filtered dry air coming through duct 10 sheathes and matches the velocity of the incoming aerosol, thus effectively protecting the aerosol from turbulence and eliminating diversion of the aerosol in its passage to the recording film. The apparatus for controlling the air flow so as to yield this matched velocity is conventional and is not shown herein. The appropriate switches in the electrical system are closed which actuate the blower motor 27 and reel drive motor 25 along with providing and introducing power through dry air duct 10 for the precipitating pins. As the aerosol sample passes through the intake tube, the precipitating pins strip it of droplets or particles which impinge the film passing over the bridge 4.

The electrical discharge pattern is smooth over a wide potential range and due to the separate pins the pattern may easily be changed and thus controlled. The pins possess a relatively long life due to the process of their preparation and the material. The necessary number of pins properly positioned and spaced, effect a discharge pattern which adequately encloses the incoming aerosol and efficiently strips particles or droplets therefrom.

In summary, the embodiment set forth herein precipitates droplets or particles from an aerosol stream onto a travelling recorder with the result that such data as the rate of precipitation, size of droplets or particles, and nature thereof may be determined. Through conventional vacuuming means the aerosol is drawn into and through tube 6 of precipitation head 5 and passed beyond tube 6 into an area in which it comes under the action of two separated electrode structures, the first completely surrounding the flow of the aerosol, i.e., pins 9 and the second in the path of the aerosol flow, i.e., button 13. Due to coronal discharge and the electric field set up by these electrode structures droplets or particles present in the aerosol are charged and then precipitated toward the second electrode structure. En route to the second electrode structure they are caught upon the intervening recorder i.e. film 17. The extruded air flow coming from annulus 8 which sheathes the aerosol as it leaves tube 6 eliminates turbulence in and diversion of the aerosol stream and also protects pins 9 over which it travels. The ancillary equipment specified herein provides a continuous run of film, dries and stores the film and supplies the necessary potential to the electrodes.

Experience indicates that low impaction efficiencies are sufficiently eliminated and that the recording mechanism overcomes inherent resolution difficulties found in conventional recorders. Since the amount of aerosol being sampled may be adequately determined by the vacuum control mechanism, and the recorder speed easily determined by suitable means for that purpose, the quantity of aerosol sampled per unit of time, as opposed to the number of particles or droplets precipitated, provides a continuous and permanent record thereof.

Experience also indicates that although the impaction efficiencies are increased, the precipitation may be controlled to avoid break-up of larger particles or droplets into smaller ones, thereby preventing an inaccurate count. Such permits particles as small as 1 micron to be accurately measured. The metal baffles or screens function to keep the dry air from streaming, and turbulence and to distribute the proper electrical potential to the pins. However, the baffles are not positioned to function as a solid edge for the pins but rather are located to avoid such quite effectively. The droplets or particles impinging the film create permanent spots thereon which may be developed in some suitable manner, such as by sunlamp, and reduction in a suitable manner, such as by phenylhydrazine vapors, may be used to indicate not only the physical size of the droplet to within a small percentage, but also to indicate the chemical substance or substances that are present therein.

The instant precipitator may be modified to lessen its weight considerably by employing other components and in this respect a high "Q" oscillator-rectifier power supply or a high voltage electrostatic generator may be used in lieu of the previously described electrical system, and hence, some mechanism for vaning the instrument becomes more practical and easier to implement. The range of film speeds may be such that a wide variety of sampling conditions can be covered. However, the present device may be used to indicate a wide range of solutes by a change of the film employed. Small particles, both wet and dry, may be collected with substantially high efficiency, and other atmospheric phenomena of interest, such as smogs, may be studied by utilization of the instant precipitator.

It should be understood, of course, that only a preferred embodiment of the invention has been set forth in this disclosure and that it is intended to cover all changes and modifications of the examples of the invention herein chosen for the purposes of disclosure, which do not constitute departures from the spirit and scope of the invention.

Obviously, many modifications and variations of the present invention are possible in the light of the above teachings. It is therefore to be understood that within the scope of the appended claims the invention may be practiced otherwise than as specifically described.

What is claimed is:

1. A sampler for precipitating solid and liquid particles from an aerosol and for collecting, in permanent-record form, said particles substantially without altering their form and character as they existed in the aerosol for enabling determination of the size and nature of the individual aerosol-borne particles and the quantity of said particles within a given sample of aerosol; said sampler comprising means for effectuating moving passage of the to-be-examined aerosol in a given direction, said moving aerosol defining an aerosol stream; operator-controllable electrically-actuated electrode means, located in encompassing position around said aerosol stream and radially outwardly beyond the path of said stream in a position where said electrode means is out of contact with said aerosol stream, for originating a coronal discharge; particle collecting means, located in the path of said aerosol stream and spaced downstream from said electrode means, said collecting means being of different polarity from said electrode means so as to receive the coronal discharge originating from said electrode means and to form in union with said electrode means a potential gradient therebetween, said electrode means and said collecting means cooperating to both ionize particles in said aerosol by virtue of the coronal discharge pattern established therebetween and to establish an electric field between said electrode means and said collecting means, said electric field acting to precipitate ionized aerosol-borne particles onto said collecting means, the particles deposited on said collecting means being borne thereto by gaseous transport and electric field precipitation.

2. The sampler of claim 1 wherein said collecting means is grounded and wherein negative feedback means is located intermediate said collecting means and ground for cancelling out any disruptive changes to the operator-selected coronal discharge pattern between said electrode means and said collecting means which might be introduced because of shift in the effective resistance of the aerosol located between said electrode means and said collecting means due to shifting characteristics of the particles and/or quantity thereof from time to time in said aerosol portion located between said electrode means and said collecting means.

3. The sampler of claim 1 wherein said aerosol-stream-encompassing electrode means is located closely adjacent said aerosol stream.

4. The sampler of claim 1 wherein said electrode means comprises an annular ring of electrically-connected, circumferentially-spaced, needle-like pins each of which is disposed parallel to the direction of flow of said aerosol stream and which cooperate to produce an intense multi-point electric coronal discharge.

5. The sampler of claim 4 wherein said electrode means is a cathode and said collecting means comprises an anode located medially with respect to said aerosol stream and medially with respect to the projection of said electrode means and a driven, uniformly-travelling, translatingly-moving, electrically-conductive film moving in sliding contact with said anode and interposed between said anode and the oncoming aerosol stream so as to catch thereupon particles deposited from said aerosol.

6. The sampler of claim 1 further characterized by means for establishing a longitudinally-extending sheath of dry, filtered air circumferentially around said aerosol stream, said sheath extending in length from the vicinity of said electrode means to said particle collecting means, the portion of said dry-air sheath in the vicinity of said electrode means being in part disposed in protective position between said electrode means and said aerosol stream.

7. The sampler of claim 6 wherein the coronal-discharge-emitting portion of said electrode means is completely covered by the dry air of said air sheath.

8. The sampler of claim 1 further characterized by means for establishing a longitudinally-extending sheath of contaminant-free, dry gas circumferentially around said aerosol stream, said sheath extending in length from the vicinity of said electrode means to said particle collecting means, the portion of said gaseous sheath in the vicinity of said electrode means being in part disposed in protective position between said electrode means and said aerosol stream.

9. The sampler of claim 6 wherein the air composing said air sheath moves with a speed and direction which matches the speed and direction taken by said aerosol stream.

10. The sampler of claim 1 further characterized by means for, concurrently, isolating said electrode means from contact with said aerosol stream and channelling said aerosol stream from the region of said electrode means to said collecting means.

11. The sampler of claim 1 further characterized by means for, concurrently, isolating said electrode means from possible contact with aerosol from said aerosol stream, channelling said aerosol stream from the region of said electrode means to said collecting means and producing isokinetic entrance of aerosol into said sampler thereby preventing edge effects which cause premature precipitation of aerosol-borne particles onto portions of the sampler other than said collecting means.

References Cited in the file of this patent

UNITED STATES PATENTS

| 2,100,155 | Beran | Nov. 23, 1937 |
| 2,698,669 | Wintermute | Jan. 4, 1955 |
| 2,868,317 | Maas et al. | Jan. 13, 1959 |
| 2,868,318 | Perkins et al. | Jan. 13, 1959 |

FOREIGN PATENTS

| 839,110 | Germany | May 15, 1952 |